US006697519B1

(12) United States Patent
Rao

(10) Patent No.: US 6,697,519 B1
(45) Date of Patent: Feb. 24, 2004

(54) COLOR MANAGEMENT SYSTEM FOR CONVERTING COMPUTER GRAPHIC IMAGES TO FILM IMAGES

(75) Inventor: Arun Rao, San Ramon, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 09/182,070

(22) Filed: Oct. 29, 1998

(51) Int. Cl.$^7$ .............................. G06K 9/00; G06F 13/00
(52) U.S. Cl. ........................ 382/162; 345/603; 345/589
(58) Field of Search ................................ 382/162, 163, 382/164, 165, 166, 167, 168, 169, 170, 171, 172; 358/517, 518, 519, 520, 521, 530, 531, 909.1; 345/589, 603, 604

(56) References Cited

U.S. PATENT DOCUMENTS

| | | | | |
|---|---|---|---|---|
| 4,357,624 A | * | 11/1982 | Greenberg | .................... 358/22 |
| 4,958,220 A | * | 9/1990 | Alessi et al. | ................... 358/76 |
| 4,979,032 A | | 12/1990 | Alessi et al. | ................... 358/76 |
| 5,206,918 A | * | 4/1993 | Levene | ......................... 382/17 |
| 5,243,414 A | * | 9/1993 | Dalrymple et al. | .......... 358/500 |
| 5,272,518 A | * | 12/1993 | Vincent | ....................... 356/405 |
| H1506 H | * | 12/1995 | Beretta | ........................ 345/199 |
| 5,528,339 A | * | 6/1996 | Buhr et al. | .................... 355/32 |
| 5,537,157 A | * | 7/1996 | Washino et al. | ............. 348/722 |
| 5,754,184 A | | 5/1998 | Ring et al. | .................... 345/431 |

FOREIGN PATENT DOCUMENTS

| | | | | |
|---|---|---|---|---|
| EP | 0 637 731 A1 | 2/1995 | ............. | G01J/3/46 |
| EP | 0 814 603 A2 | 12/1997 | ............. | H04N/1/60 |
| WO | WO 95/31794 | 11/1995 | ............ | G06T/11/00 |

OTHER PUBLICATIONS

Arjun Ramamurthy et al., "Achieving Color Match Between Scanner, Monitors and Film: A Color Management Implementation for Feature Animation", SMPTE Journal Jun. 1999, pp. 363–373.

"Developments in Colour Management Systems", Lindsay W. MacDonald, *Displays*, Vol 16, No. 4, 1996, pp. 203–211.

"Achieving Color Match Between Scanner, Monitor, and Film: A Color Management Implementation for Feature Animation", A. Ramamurthy, L. Davis and F Herbert, *SMPTE Journal*, Jun. 1999, pp. 363–373.

"Development of Color Management System Prototype", Kim Jin–Seo et al., *IEEE*, 1998, pp. 2539–2532.

PCT Search Report in Corresponding PCT Application PCT/US99/23981.

Has, Michael, Newman, Todd; "Color Management: Current Practice and The Adoption of a New Standard"; *Advances In Printing Science and Technology*, vol. 23, pp. 51–68, 1997; (Conference proceedings of the International Association of Research Institutes for the Graphic Arts Industry, held in Paris, Sep. 1995).

Has, Michael, Newman, Todd; "Color Management: Current Practice and The Adoption of a New Standard"; Proceedings of the Commission Internationale de l'Eclairage (CIE), Expert Symposium on Colour Standards for Image Technology; (held in Vienna, Mar. 1996) Wien, CIE, 1998.

Hunt, Robert W.G.; "Model of Color Vision for Predicting the Appearance of Colors Under Different Viewing Conditions"; SPIE Conference on "Device–Independent Color Imaging and Imaging Systems Integration"; Feb. 1–3, 1993, San Jose, California; vol. 1909; pp. 2–14.

(List continued on next page.)

*Primary Examiner*—Andrew W. Johns
*Assistant Examiner*—Amir Alavi
(74) *Attorney, Agent, or Firm*—Townsend and Townsend & Crew LLP

(57) ABSTRACT

A system for efficiently converting computer graphics images to film images with accurate color management is described. The system involves the creation of a direct mapping of chromaticity and intensity data from the values used to generate images on a computer monitor to the values used to display the images on projected motion picture film.

19 Claims, 2 Drawing Sheets

OTHER PUBLICATIONS

Murch, Gerald, Othmer, Konstantin, Swen, Steve; "Apple Color Management System (ColorSync™)"; SPIE Conference on "Device–Independent Color Imaging and Imaging Systems Integration"; Feb. 1–3, 1993, San Jose, California; vol. 1909; pp. 184–188.

Foley, James D. et al.; *Computer Graphics: Principles and Practice*; Second Edition; Chapter 13 Entitled "Achromatic and Colored Light", pp. 563–604, 1990.

Gennetten, Douglas K.; "RGB to CMYK Conversion Using 3–D Barycentric Interpolation"; SPIE Conference on "Device–Independent Color Imaging and Imaging Systems Integration"; Feb. 1–3, 1993, San Jose, California; vol. 1909; pp. 116–126.

Gentile, R.S., Walowitt, E., Allebach, J.P.; "A Comparison of Techniques for Color Gamut Mismatch Compensation"; *Journal of Imaging Technology*; Oct. 1990; vol. 16, No. 5; pp. 176–181.

Granger, Dr. Edward M.; "Achieving Device Independence In Color Through Appearance Modeling"; SPIE Conference on "Device–Independent Color Imaging and Imaging Systems Integration"; Feb. 1–3, 1993, San Jose, California; vol. 1909; pp. 15–18.

Guth, S. Lee; "Model for Color Vision and Light Adaptation"; *Journal of the Optical Society of America*; vol. 8, No. 6; Jun. 1991; pp. 976–993.

Has, Michael; "Color Management—Current Approaches, Standards and Future Perspectives"; Proceedings of IS&T's Eleventh International Congress on Advances in Non–Impact Printing Technologies; Hilton Head, South Carolina pp. 441–445.

\* cited by examiner

COLOR MANAGEMENT SYSTEM FOR CONVERTING COMPUTER GRAPHIC IMAGES TO FILM IMAGES

The present invention relates to digital film production and, more particularly, to techniques for efficiently and accurately converting color computer graphics images to film images.

BACKGROUND OF THE INVENTION

When creating a computer-animated motion picture, the animation team uses computers to create, view, and manipulate images used in the motion picture. The animation team makes judgments concerning the desired appearance of the images, and manipulates the images, based on how the images appear when displayed on the computer monitors.

The motion picture ultimately will be displayed to a theater audience using conventional motion picture film and projectors. Accordingly, the image data stored on computer must be converted into film images for projection in a theater.

Digital film recorders are used to convert the original, computer-generated images created by the animation team into images on photosensitive motion picture film. Conventional digital film recorders use a light source (such as a laser) to expose each frame of the film as necessary to produce the desired image in the frame. The film is then advanced to the next frame and the process is repeated. When a strip of film has been recorded, it is sent to a laboratory for development into a color negative and, ultimately, a positive print.

To create high quality computer-generated films, film producers must make certain that the ultimate appearance of the motion picture that is projected and viewed by an audience matches the appearance desired by the creative team. The color of each location on the exposed film should match, as closely as possible, the color of the corresponding picture element ("pixel") on the display device used by the artist who created the image. To produce a visually accurate color image using a digital film recorder, the locations on a frame of film that correspond to each pixel of an image must be exposed precisely. The calculation of this exposure (for each primary component, red, green and blue) depends on the nature of the source and the characteristics of the film used.

Producing a film image that corresponds visually to the original image created and/or stored on a computer is not as straightforward as it might initially appear. Difficulties arise because the color densities produced on a film generally do not correspond linearly to the RGB color values that displayed on the computer monitor. The color densities actually produced on the film are affected by a variety of factors, including chemical characteristics of the film itself. For example, due to chemical characteristics of the film, the density of a particular color produced on the film by a beam of light generally will not vary linearly with the intensity of light used to expose the film for a given time duration. Temperature, film type, characteristics of a light source used in the recorder and noise generated by the system can affect the color density values actually produced.

Similarly, the stored value used to produce a particular measured density for one color component in a neutral tone generally will not produce the same measured density in color. For example, if the combination of red, green and blue code values X1, Y1 and Z1 produce measured red, green and blue densities R1, G1, and B1, then the red code value X1 used in combination with different green and blue code values (i.e., Y2 and Z2) generally will not produce the density R1.

The monitor itself has nonlinear, characteristics. The well-known gamma correction process is used to correct for nonlinearities in specific monitors. Nevertheless, even a monitor's characteristics tend to degrade over time. Monitors operate in RGB color spaces in which colors are created by mixing proportions of Red, Green and Blue light. Monitors from different suppliers may use different phosphors and an individual monitor itself will age. This is equivalent to different or gradually changing color spaces. All of these problems and complexities suggest to those skilled in the field the complex color management schemes necessary.

Another problem is that the film cannot reproduce all the colors reproducible on the monitor (the converse is also true, but less important since we're only trying to mimic the monitor). This phenomenon is referred to as "gamut mismatch," and treating such cases in a consistent manner is difficult. One approach would be to take all the colors that are outside the film's gamut and map them to the closest (in some sense) point on the surface of the film's gamut. Colors which are inside the gamut to start with would be left alone. This approach, however, results in abrupt color changes which result in banding artifacts in the final image.

Industry literature generally teaches that solutions to the above-described problems must be complex. "Historically, managing color has been a very time consuming and costly process in the printing, prepress, and film industries." Has & Newman, Color Management: Current Practice and The Adoption of a New Standard. "Color is an immensely complex subject, one that draws on concepts and results from physics, physiology, psychology, art, and graphic design. The color of an object depends not only on the object itself, but also on the light source illuminating it, on the color of the surrounding area, and on the human visual system." See Foley and Van Dam, *Computer Graphics Principles and Practice* (Second Edition 1996).

In accordance with such theory, conventional approaches to producing color images on film that match the originally created computer graphics images have been complex. For example, some conventional approaches involve the use of complex models of the film development process to change the primary color component values derived from the computer graphics images into values that will produce a similar visual result on film. Other conventional approaches arrive (by trial and error and much manual tweaking) at a transfer curve for each channel such that the colors on the screen look acceptable. Such methods do not allow for fine-grained, color-by-color matching. In any event, it is generally understood that brightness, or intensity, values that are used in connection with the display of images on a computer screen cannot be converted to the film media, as they are irrelevant to the visual perception of the film in the theater environment. In the theater environment, so the reasoning goes, the psychophysical perception of various colors by the audience is affected by the darkness of the theater and numerous other subtle factors that are difficult or impossible to account for in advance. It is generally understood that the intensity value of each color component must be determined by visual inspection in the new medium (i.e., the film projected in a theater environment).

Conventional approaches to dealing with the above matter typically address the reproduction of color on print media, which cannot reproduce colors as well as monitors can. Most importantly, the dynamic range, (ratio of maximum to minimum brightness values) is substantially lower than that of monitors. Much attention is therefore focused on the problem of compressing the dynamic range. Film, on the other hand, offers a dynamic range that is comparable (or even larger) than that of monitors, an issue which has not been addressed adequately in the literature.

Efficient and accurate techniques for converting color computer graphics images to film images would be highly desirable.

SUMMARY OF THE INVENTION

The present invention involves a color management system for efficiently and accurately converting computer graphics images to film images. In certain embodiments, the system includes at least three steps: determining an RGB-to-XYZ mapping for the monitor; measuring the RGB-to-XYZ mapping applicable to the film recording; and creating an RGB-to-RGB mapping for operating on the image colors displayed on the monitor to create accurate color densities on the film. In many embodiments, each mapping uses color spaces that incorporate both chromaticity and intensity data for each color component.

As will be understood by those skilled in the art based on the present disclosure, a wide variety of embodiments of the present invention exist and fall within the scope of the claims set forth herein. The scope of the present invention is defined by the claims.

DETAILED DESCRIPTION OF PREFERRED EMBODIMENT(S)

Figure 1:
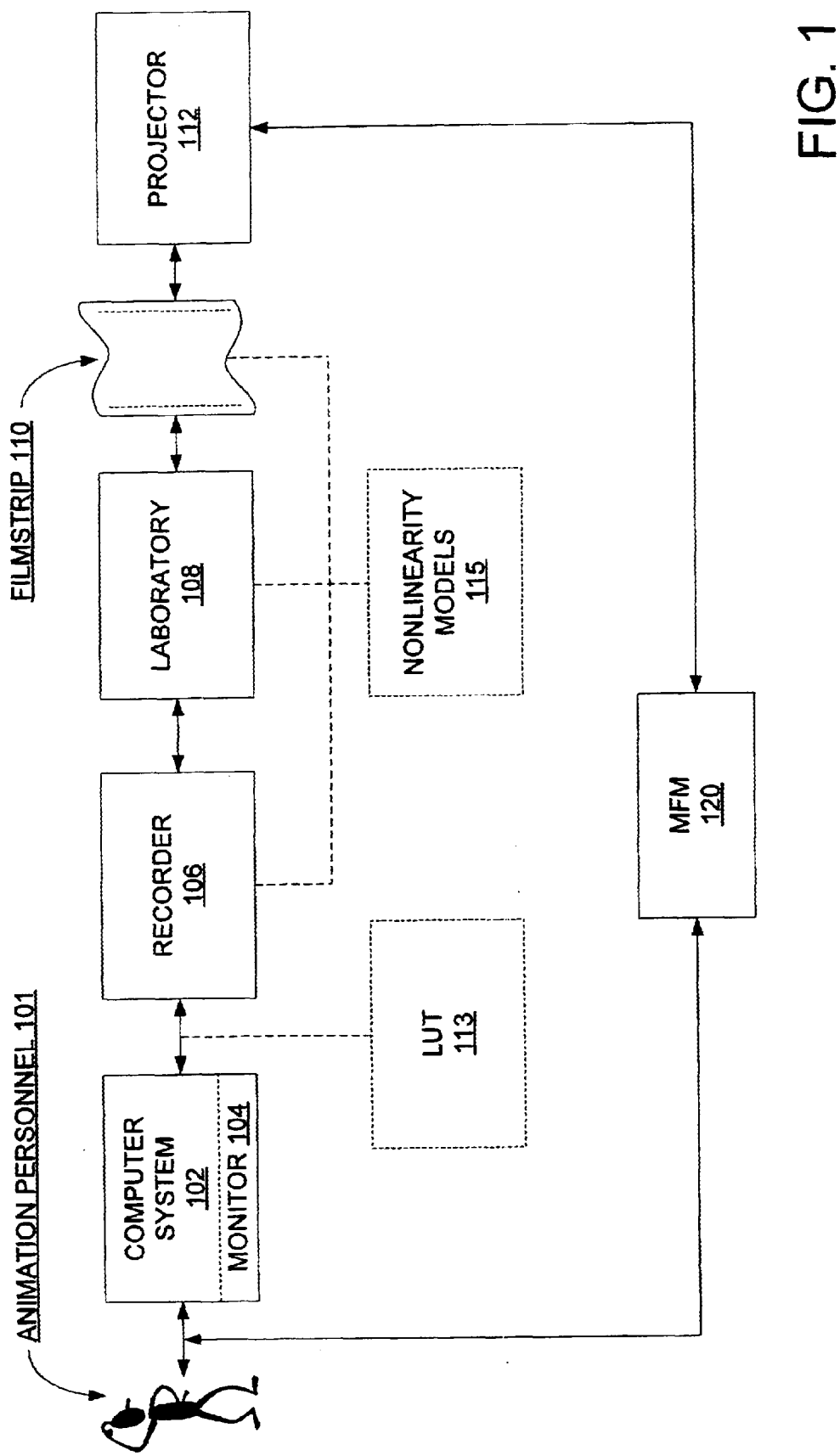
FIG. 1 shows one embodiment of a digital film production system in connection with which color management according to the present invention is useful.
Figure 2:
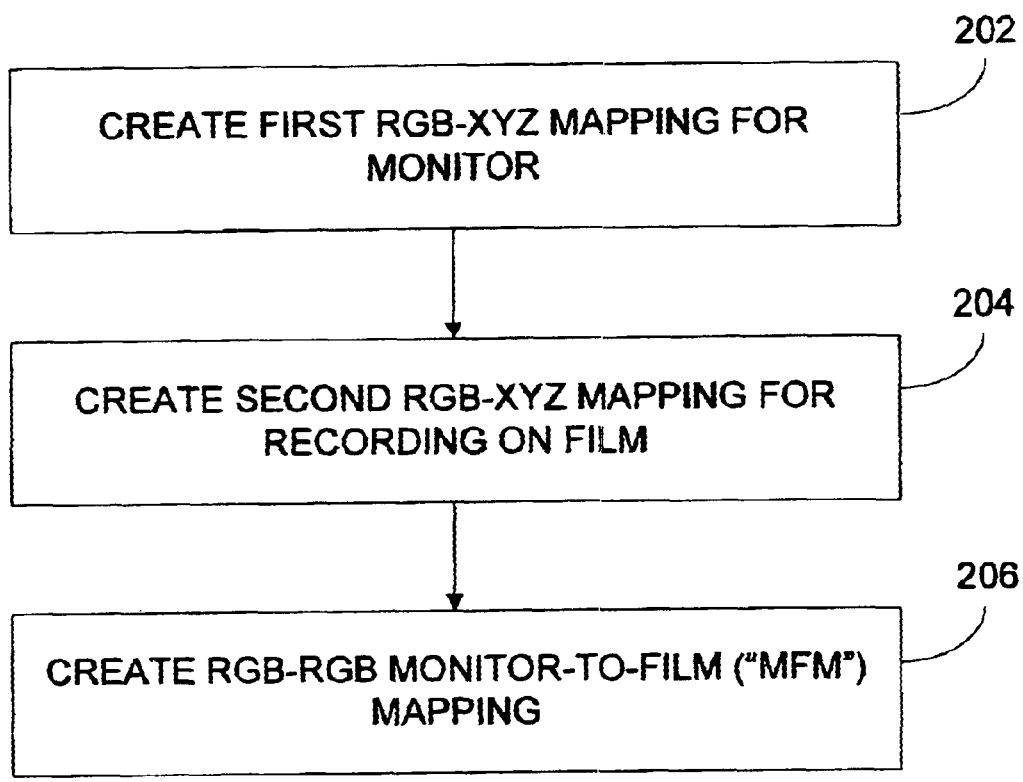
FIG. 2 shows a series of steps for performing color management according to the present invention.

A diagram of one example of a digital film production system for recording computer-generated images onto motion picture film is illustrated at 10 in FIG. 1. Embodiments of the present invention are useful when performing color management in connection with any conventional film production system, including film production system 10.

In FIG. 1, computer system 102 preferably is a workstation, although any conventional computer system may be used. In addition to other conventional components, computer system 102 comprises a conventional monitor 104 used to view images during the film production process. Creative personnel 101 create, manipulate and modify images on computer system 102, viewing the images on monitor 104 and basing their creative judgments regarding color in part on the appearance of the images when displayed on monitor 104.

After images have been created and modified using computer system 102, the images are printed onto motion picture film using a film recorder 106. Film recorder 106 is a conventional digital film recorder, preferably a laser recorder that exposes film according to specified RGB values. It will be appreciated by those skilled in the art that the present invention is also useful in connection with CRT and EBR (electron beam) recorders.

The recorded filmstrips are then sent to a photographic laboratory ("lab") 108 for processing. In a conventional manner, the filmstrips are developed to create a negative, which is used to create a positive filmstrip 110.

Filmstrip 110 is then viewed using a conventional motion picture film projector 112.

In the past, in order to address the problem of color management with respect to chromaticity alone, film producers have created a look-up table 113 to convert the color data stored on the computer into color data that can be used by film recorder 106 to expose a strip of film and used complicated models 115 to account for nonlinearities during laboratory processing. The film has then been viewed using projector 112 to determine appropriate intensity levels for each color component for a given motion picture. Certain embodiments of the present invention eliminate the need for such complexity.

In accordance with the present invention, color management is performed in connection with converting the computer graphics images created on computer system 102 to the film images printed on filmstrip 110 that are projected for a viewing audience using projector 112. Certain embodiments of the present invention looks at the system "end-to-end," from the computer graphics image input to the projected image output, and involve the creation of a monitor-to-film ("MFM") mapping 120 for the system using color spaces that incorporate both chromaticity and intensity data for each color component.

Color management in accordance with certain embodiments of the present invention involves three main steps, which need not be performed in the order listed below. The first step (step 202) is to determine a first RGB-to-XYZ mapping applicable to the monitor. This first RGB-to-XYZ mapping preferably uses color spaces incorporating both chromaticity and intensity data for each color component.

The XYZ color space is a way of representing color information in device independent terms in a manner that incorporates both intensity and chromaticity data for each color component. The basis of device independent color representation is usually the Commission Internationale De L'Eclairage ("CIE") XYZ space. It will be apparent to those skilled in the art, based on the present disclosure, that color spaces other than the CIE XYZ space may be used as the XYZ color space for purposes of the present invention.

Certain embodiments' of the present invention use an adaptation of the ATD space proposed by Lee Guth. Other embodiments use other perceptually uniform spaces, like CIELab or CIELuv. Those skilled in the art will recognize that the color space in which measurements are made (XYZ) and the computation space (ATD, preferably) are distinct. As will be apparent to those skilled in the art, the choice of computation space is important for the treatment of out-of-gamut colors.

The second step (step 204) is to make appropriate measurements to create a second RGB-to-XYZ mapping applicable to the film recording. The second RGB-to-XYZ mapping preferably uses color spaces incorporating both chromaticity and intensity data for each color component. To accomplish this objective, one records a strip of 1000 frames of flat color patches calculated to span the entire RGB space (10 steps along each axis). Next, one projects these frames on to a screen, and points a spectrophotometer (preferably, a Spectrascan PR-650) at the center of the patch. One reads the spectrum (101 samples in 4 nm steps from 380 to 780 nm), corrects it for the projector bulb spectrum (i.e. divide by test projector spectrum and multiply by theater projector spectrum), and converts to an XYZ triple by integration. (This integration process is well-defined by CIE). One thus obtains asset of 1000 readings, where each reading consists of a pair of triples: the RGB triple used to record the patch, and the resulting XYZ triple. The XYZ values are converted finally to the internal computation space (ATD).

The third step (step 206) is to create an RGB-to-RGB mapping, preferably incorporating both chromaticity and intensity data for each color component, for operating on the image colors displayed on the monitor to create accurate color densities on the projected film.

The present invention also addresses the issue of gamut mismatch. The basic idea is to "pull in" colors along a line connecting the gray (or achromatic) axis and the color to be reproduced. This line intersects both film and monitor gamut surfaces. If the monitor surface intersection is nearer than the film surface intersection, one need do nothing, because all colors along this line are reproducible on film. If not, one smoothly (using a quadratic function) remaps colors along the line such that the monitor surface intersection color is mapped to the film surface intersection color.

Although the present invention has been described in connection with certain specific embodiments, it will be clear to those skilled in the art that the inventive features of the present invention are applicable to other embodiments as well. All of such embodiments are intended to fall within the scope of the present invention.

Based on the present disclosure, those skilled in the art will understand that the present invention has broad applicability in connection with the use of computers during the production or processing of film. For example, embodiments of the present invention are useful in connection with computer generation of entirely synthetic images for 2D or 3D animation. Embodiments of the present invention are also useful in connection with the use of computers to modify live action film, either for touch up or to add special effects.

What is claimed is:

1. A color management system for converting computer graphics images to film images, comprising;
   determining a first RGB to XYZ mapping applicable to the monitor, said first RGB to XYZ mapping using color spaces incorporating chromaticity and intensity data for each color component;
   recording a plurality of film images onto film using a film recorder driven with specified RGB values;
   outputting the plurality of film images with a projection system as a plurality of projected images;
   recording a plurality of light samples from the plurality of projected images;
   determining a second RGB to XYZ mapping applicable to the film recorder in response to the plurality of light samples and the specified RGB values, the second RGB to XYZ mapping using color spaces incorporating chromaticity and intensity data for each color component; and
   determining an RGB to RGB mapping, incorporating chromaticity and intensity data for each color component, for operating on the image colors displayed on the monitor to create accurate color densities on the film in response to the first RGB to XYZ mapping applicable to the monitor and in response to the second RGB to XYZ mapping applicable to the film recorder.

2. A method for a computer system comprises:
   determining a first RGB to XYZ color space mapping, wherein the first RGB to XYZ color space mapping is associated with a monitor and wherein the XYZ color space is device independent;
   determining a second RGB to XYZ color space mapping, wherein the second RGB to XYZ color space mapping is associated with a film recorder and determined in response to a plurality of images that are recorded with the film recorder and sampled;
   determining a smooth remapping from a monitor gamut in the XYZ color space to a film recorder gamut in the XYZ color space; and
   determining an RGB to RGB mapping between monitor driving RGB values and film recorder driving RGB values, in response to the first RGB to XYZ color space mapping, to the second RGB to XYZ color space mapping, and to the smooth remapping.

3. The method of claim 2, wherein the XYZ color space comprises chromaticity and intensity data; and
   wherein the smooth remapping from the monitor gamut to the film recorder gamut includes intensity data.

4. The method of claim 2, wherein determining a smooth remapping from the monitor gamut and the film recorder gamut comprises:
   identifying a first color in the XYZ color space;
   when the first color is within the monitor gamut but not within the film recorder gamut, the method further comprises:
      determining a first distance between a gray location and a color on a surface of the monitor gamut in a direction along a line from the gray location through the first color;
      determining a second distance between a gray location and a color on a surface of the film recorder gamut in the direction along the line; and
      remapping colors ranging from the gray location to the color on the surface of the monitor gamut to colors ranging from the gray location to the color on the surface of the film recorder gamut.

5. The method of claim 2, further comprising storing the RGB to RGB mapping in a look up table.

6. The method of claim 5 further comprising:
   receiving RGB values associated with the monitor;
   mapping the RGB values associated with the monitor to RGB values associated with the film recorder via the look up table; and
   writing an image to film with the film recorder using the RGB values associated with the film recorder.

7. The method of claim 2 wherein the smooth remapping from the monitor gamut and the film recorder gamut occurs at different intensity values.

8. The method of claim 2 wherein a first color and a second color in the monitor gamut but not within the film recorder gamut are not mapped to the same color within the film recorder gamut.

9. The method of claim 2 wherein determining the second RGB to XYZ color space mapping associated with a film recorder comprises:
   writing recording a plurality of images to film with a film recorder using RGB values;
   projecting the plurality of images written to the film with a projector;
   determining colors for the projected images; and
   converting colors of the projected images into XYZ color space.

10. A color management system comprises:
    a computer system including a monitor configured to display a series of images, wherein the computer system is configured to drive the monitor with RGB signals;
    a film recorder configured to record the series of images onto film, wherein the film recorder is configured to be driven with RGB signals;

a processor coupled to the computer system and to the film recorder, the processor configured to map from RGB drive values for the monitor to RGB drive values for the film recorder;

wherein a mapping from RGB drive values for the monitor to RGB drive values for the film recorder are determined in response to a mapping, between the RGB drive values for the monitor and chromaticity and intensity values for the monitor, in response to a mapping, between the RGB drive values for the film recorder and the chromaticity and intensity values associated with images on the film that are written by the film recorder, and in response to a mapping; from a monitor gamut in chromaticity and intensity color space to image gamut of the film in the chromaticity and intensity color space.

11. The color management system of claim 10, wherein the computer system comprises a work station.

12. The system of claim 10, wherein the film recorder comprises a digital film recorder configured to expose the film with light at predetermined intensity levels corresponding to specified RGB values.

13. The computer system of claim 10, wherein a color is within the monitor gamut but not within the image gamut.

14. The computer system of claim 10, wherein a color is within the film recorder gamut but not within the monitor gamut.

15. The computer system of claim 10, wherein the mapping from the RGB drive values for the monitor to RGB drive values for the film recorder compensates for different intensities for each color component.

16. The color management system of claim 10 wherein a first color that is within the monitor gamut but not within the film recorder gamut is remapped into a first color that is within the film recorder gamut;

wherein a second color that is within the monitor gamut but not within the film recorder gamut and that is co-linear to a line drawn from a gray color to the first color, is remapped into a second color that is within the film recorder gamut; and wherein the first color is different from the second color.

17. The method of claim 10 wherein the mapping from the RGB drive values for the monitor to RGB drive values for the film recorder associates an RGB drive value for the monitor with an RGB drive value for the film recorder, and wherein at least one color component of the RGB drive value for the monitor is larger than a corresponding color component of the RGB drive value for the film recorder.

18. The method of claim 10 wherein the processor configured to map from RGB drive values for the monitor to RGB drive values for the film recorder comprises a look-up-table.

19. The method of claim 10 wherein the values associated with images on the film written by the film recorder are determined by illuminating the images on the film and sampling outputs of the images while the film is illuminated.

* * * * *